(No Model.)

J. A. MORSMAN.
HARROW.

No. 362,990. Patented May 17, 1887.

Witnesses.
A. Ruppert
W. T. Burris

Inventor.
J. A. Morsman
Per
Thomas P. Simpson
Atty

UNITED STATES PATENT OFFICE.

JOHN ALEXANDER MORSMAN, OF MAPLETON, KANSAS.

HARROW.

SPECIFICATION forming part of Letters Patent No. 362,990, dated May 17, 1887.

Application filed March 30, 1887. Serial No. 232,994. (No model.)

*To all whom it may concern:*

Be it known that I, JOHN ALEXANDER MORSMAN, a citizen of the United States, residing at Mapleton, in the county of Bourbon and State of Kansas, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then pointed out in the claim.

Figure 1:
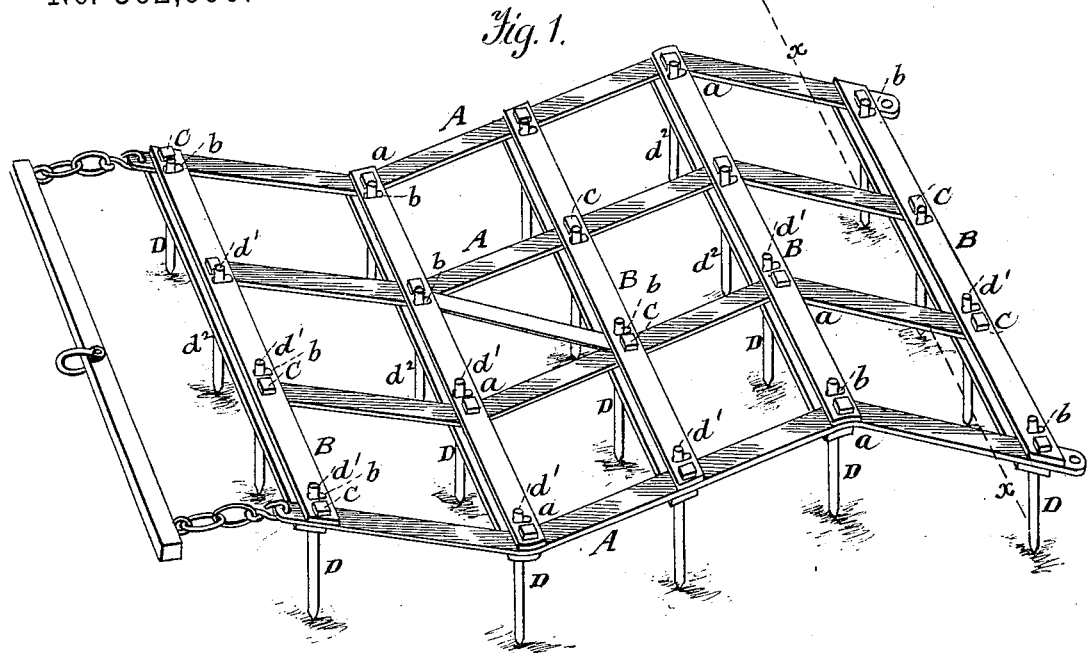
Figure 2:
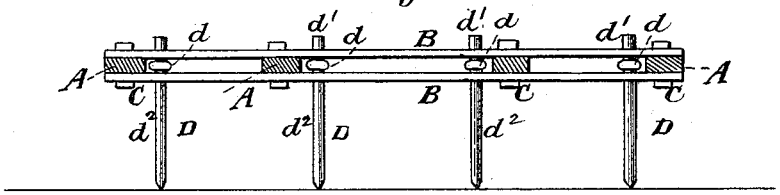
Figure 3:
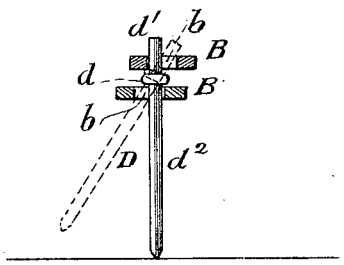

Figure 1 of the drawings is a perspective view of my improved harrow; Fig. 2, a cross-section on line $x\ x$ of Fig. 1; Fig. 3, a detail view in elevation of my improved harrow-tooth.

In the drawings, A represents the longitudinal and B the transverse bars. The longitudinal bars A are reversely obtuse-angled at $a$, and parallel to each other, while the bars B are in duplicate, the bars A being fastened by bolts or rivets C between the cross-bars B, which are straight and parallel to each other.

D are the teeth, which have a head, $d$, and a shank on opposite sides thereof, one shank, $d'$, passing through the top bar, B, and the other shank, $d^2$, passing through the bottom bar. The holes $b$, through which pass the shanks $d'\ d^2$, are corresponding cross-slots, the head $d$ being placed between the bars and being loose, so that the shanks can turn from a perpendicular to an inclined position, or the reverse, according to the end of the harrow from which the horses draw.

I may use diagonal braces between the bolts or rivets C; but they are only necessary when a very strong harrow is wanted for rough, rocky, or stony ground.

It will be observed that my harrow is made entirely of metal with single longitudinal and double cross bars. By my harrow the team is followed in a direct line, so that there is no tendency to work to either side, while the teeth run in or parallel with the draft without swinging about laterally.

I am aware that harrow-teeth have been hung on cross-pivots, so as to turn from a perpendicular to an incline, according to the direction in which the harrow is drawn; also, that the teeth have been given a twist to enable them to run with the edge in the line of draft while the frame is running obliquely thereto.

The advantage of my tooth, with a head or collar between two shanks, is that it turns freely in the cross-bars, so as to equalize the wear, and thus make a more lasting tooth. The cross-pivoted teeth are weakened at the point of greatest strain, where mine are solid and strongest.

My harrow is made of iron or steel bars, which can be bought at the hardware-store and worked up into the harrow by a common blacksmith without any special tools or machinery.

Having thus described all that is necessary to a full understanding of my invention, what I claim as new, and desire to protect by Letters Patent, is—

In a harrow, the cross-bars B B, made with transverse slots $b$, in combination with teeth provided with a shank passing through an upper and lower slot, and a head or collar between said cross-bars, substantially as shown and described.

In testimony whereof I affix my signature in presence of witnesses.

JOHN ALEXANDER MORSMAN.

Witnesses:
T. C. JOHNSON,
P. N. SUMNER,
E. P. HIGBY.